Figure 1:
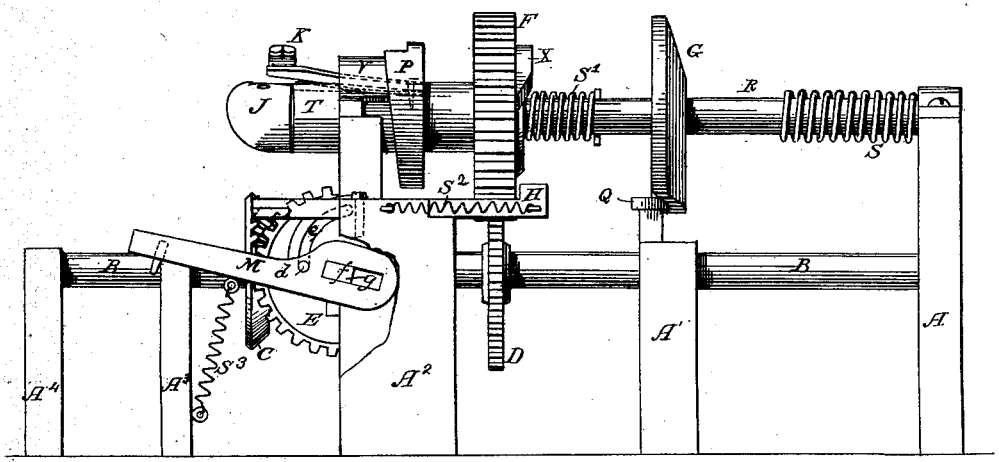

J. D. JONES.
Grain Binder.

No. 235,537.  Patented Dec. 14, 1880.

Attest:
C. Clarence Poole
E. S. Mussey

Inventor:
Jacob D. Jones

2 Sheets—Sheet 2.
J. D. JONES.
Grain Binder.
No. 235,537. Patented Dec. 14, 1880.
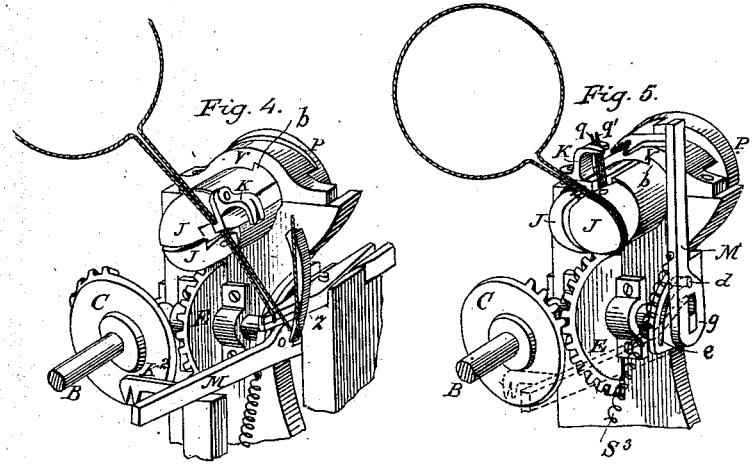
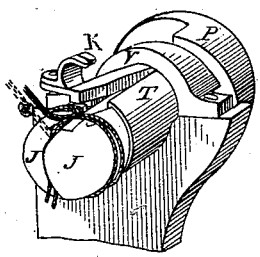
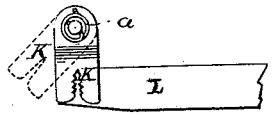
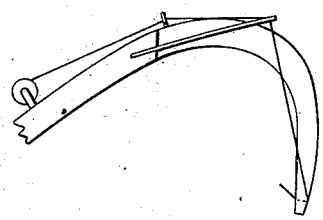
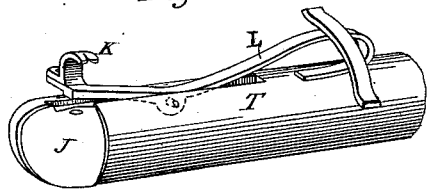
Attest:
Clarence Poole
E. S. Mussey
Inventor:
Jacob D. Jones

United States Patent Office.

JACOB D. JONES, OF WINCHESTER, VIRGINIA, ASSIGNOR TO HIMSELF AND THOMAS T. WALL, OF SAME PLACE.

GRAIN-BINDER.

SPECIFICATION forming part of Letters Patent No. 235,537, dated December 14, 1880.

Application filed August 20, 1879.

*To all whom it may concern:*

Be it known that I, JACOB D. JONES, of Winchester, in the county of Frederick and State of Virginia, have invented certain new and useful Improvements in Grain-Binders, of which invention I hereby present a full specification, reference being had to the accompanying lettered drawings, forming a part hereof.

My invention relates to that class of grain-binders which is attached to and actuated by harvesters or reapers, automatically tying the grain as it is delivered in proper shape and quantity, and has special reference to the devices for making the loop and knotting it.

I do not claim any special device for delivering the grain to the binder, nor any special device for throwing the cord around the grain, though I attach a spring to the throwing-arm so connected with the spool supplying the tying-cord as to take up the slack or yield to the strain, (a variety of such spring is shown in Fig. 8,) having found by experience that throwing-arms so provided are the best.

For distinctness in the drawings, the throwing-arm and the devices for delivering the grain to the binder are omitted.

Figure 2:
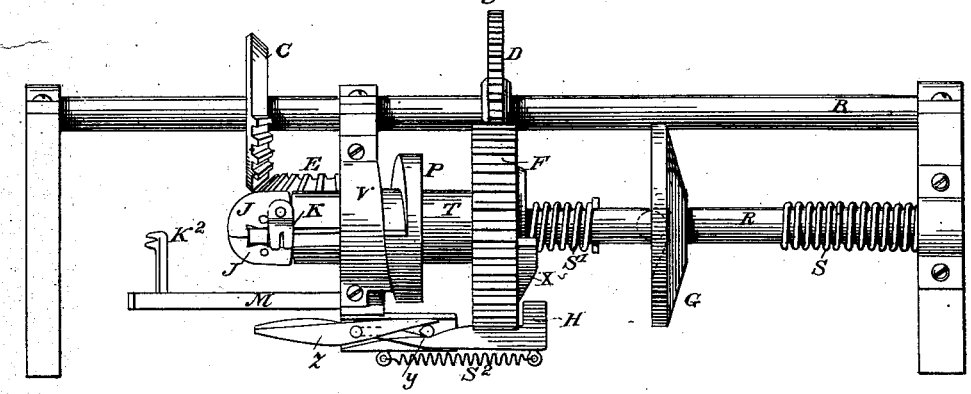
Figure 3:
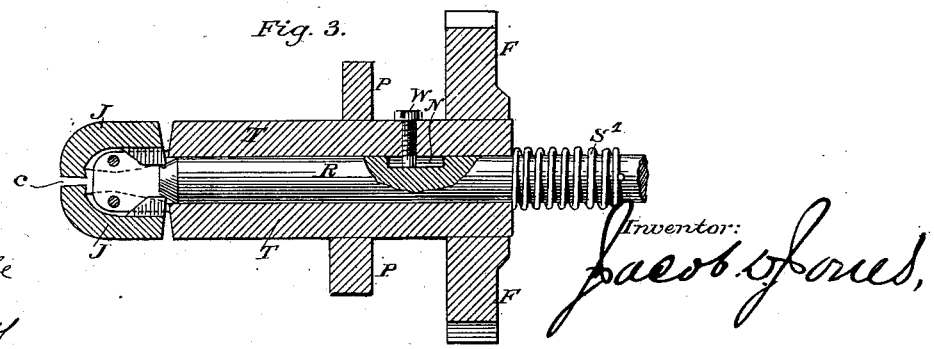

In the accompanying drawings, Figure 1 is a side elevation of my machine. Fig. 2 is a top view. Fig. 3 is a sectional detail of the tube T, &c. Figs. 4 and 5 are views showing details of the tying processes. Fig. 6 is a front view of the jaws, &c. Fig. 7 is a detail view of the latch L and cord-carrier K. Fig. 8 shows a method of attaching a take-up spring to a throwing-arm. Fig. 9 is a detail view showing the arrangement of the latch or spring L in the tube T.

In these drawings, A, A', $A^2$, $A^3$, and $A^4$ are standards or parts of the frame of my machine, affording supports and bearings. B is the driving-shaft or rod, connected with and actuated by the harvester or reaper. Upon this shaft B is a segmental bevel-gear wheel, C, whose teeth engage with those of the bevel-gear wheel E at the proper time, as hereinafter shown, and the gear-wheel D, whose teeth engage with the gear-wheel F, which latter is made enough thicker than D to allow the two wheels to remain engaged when the wheel F is slipped forward, as hereinafter shown.

R is a shaft or rod, one end of which is supported by a proper bearing upon A, the other end entering into and playing in the hollow spindle or tube T, with which it is connected by the screw W, moving in the slot N. Upon the shaft R, at a proper distance between its bearing on A and its entrance into the tube T, is fixed a circular disk, G, with a recess or cam cut in it, so that when the stud Q on the standard A', falls into it, the shaft R may be thrown forward the depth of such recess by the spring S into the tube T, against the rear of the movable jaws J J, pivoted to the tube T. These jaws are semi-cylindrical in shape, tapering somewhat from rear to front, and are laid longitudinally along the front of the tube T. On the inside of these jaws, at the rear, are beveled projections or studs, against which the beveled end of the shaft R presses when it is thrust forward by the action of the spring S, thus pushing the rear of the jaws apart and closing them in front as they are pivoted to the tube T at points in advance of their center (in length.)

Upon the tube T, near the entrance of the shaft R, is the geared-wheel F, with a projection or cam, X, to act upon the elbow of the handle or arm of the holding and cutting apparatus Z. Near the other end of the tube T there is fastened upon it the cam-disk P, the recess of which engages, at the proper time, with the corresponding projection of the bearing-guard V, by the action of the spring S'.

The tube T is recessed on top to receive the latch or spring L, which has at its forward extremity an arm bearing a cord-carrier, K. This cord-carrier is fastened to this arm by the spring-rivet $a$, or otherwise so arranged as to have a forward motion on the pivot and a quick return, as shown in Fig. 7. The carrier end of this latch is depressed by the bearing-guard V, as shown in Fig. 4, and allowed to spring back when it reaches the point $b$ by a recess in the bearing-guard. (Shown in Figs. 4 and 5.)

M is an arm, with an oblong slot, $f$, borne upon the extended journal $g$ of the wheel E, and having a pin, $d$, moving in the curved slot $e$ in a shoulder on the standard $A^2$, as shown in Figs. 1, 4, and 5. The revolution of E draws the arm M up and back, carrying the cord-carrier K² on the front of the arm over the jaws J J, as shown in Fig. 5, from which position it is retracted by the spring S³, or its equivalent. The cord-carrier K is curved like the upper half of the letter S. In each of the cord-carriers K and K² there is a V-shaped slit with serrated edges, designed to facilitate catching and holding the cord.

Z is a holder, carrying on its upper surface cutting-blades, which are omitted from the drawings for distinctness, and is formed like a pair of shears, moved backward and opened by the engagement of the cam or wedge X on the wheel F, with the elbow of the handle H drawing the handles back against the pin or stud $y$, and thrown forward and closed when X has passed out of the elbow by the helical spring S², or its equivalent.

Although I have described and shown an arrangement of the jaws J J by which they are shut in front by the pressure of the beveled end of the shaft R on projections in the rear of the jaws, I do not limit myself to that method of operating them by the shaft R, for, as will be readily seen, that shaft may be prolonged into the jaws, and so beveled as, in connection with corresponding beveled projections on the inside of the jaws, to force them together or shut them in front, and to open them in front when the shaft is pushed forward or retracted.

The operation of my machine is as follows: The grain is supposed to be delivered at the right of the binder. The end of that portion of the cord which, in forming the loop, is passed under the gavel being held by the holder Z is, by the motion of the throwing-arm, drawn back over the jaws J J. The arm is then thrown forward and over the grain, carrying the cord toward the holder Z. The shaft R is revolved from the driving-shaft B by means of the geared wheels F and D on the former and latter, respectively, the spring or latch L being open and raised above the jaws. As the revolution of R continues the recessed cam on the disk P is brought opposite to the recess in the bearing-guard V, and forced into it by the spring S'. This throws the tube T, carrying the jaws J J, forward, so that the cord which is held by Z, and that which is being supplied by the throwing-arm, both of which have been lying on the jaws, are brought under the upraised latch L under the notch in the cord-carrier K. As the revolution of R continues the latch or spring L passes out of the recess $b$ of the bearing-guard V, and is forced down against the jaws, clamping firmly the cords between itself and the jaws. The wedge or cam X on the wheel F engages in the elbow of the handle H of the holder Z, opening the leaves of the latter against the stud $y$ and releasing the cord held by it. The revolution of R continuing, the cam X passes out of the elbow of H, and the holder Z is then pulled forward sharply by the spring S², closing the leaves of the holder upon the cord just brought over by the throwing-arm. The cutters on the upper surfaces of the shears of the holder Z cut off the cord just above the surface of Z, leaving an end of cord for the next loop nipped in the holder, as shown in Fig. 4.

The cord-carrier K catches the loose ends $q$ $q'$ of the cord in its serrated notch, while the continued revolution of R winds the cords of the loop between the latch L and the gavel around the jaws, as shown in Figs. 5 and 6, the effect of the pressure of the cord upon the jaws being to close them in the rear and open them in front at $c$. Meantime the segment-gearing on the wheel C engages in the gearing of the wheel E, causing this wheel to revolve and raise the arm M, with the cord-carrier K² upon it, upward and backward over the jaws J J toward the bearing-guard V. By the time this arm has reached a vertical position the cord-carrier has arrived in front of it, carrying in its notch the ends $q$ $q'$ of the cord, as shown in Fig. 5. As the movement of the driving-shaft B continues the teeth of the wheel C are disengaged from those of the wheel E, and the arm is forcibly retracted to its original position by the spring S³. As it moves down in an arc with a shorter radius, caused by the play of shaft $g$ and pin $d$ in the slots $f$ and $e$, the end of the arm M, bearing the cord-carrier K², approaches the jaws J J, and the cord-carrier K² seizes in its notch the ends $q$ $q'$ of the cord held in K, and forces them down on the end of the tube T between the opened jaws J J into the opening $c$ over the loop that has been laid around the jaws. In this movement the forward motion of the cord-carrier K (shown in Fig. 7) facilitates the delivery of these cord ends $q$ $q'$. The stud Q then falls into the recess on the disk G, and the shaft R is forced forward by the spring S, so as to open the rear of the jaws J J and shut them in front, nipping the ends of the cords $q$ $q'$ that have been forced into the opening $c$ by the carrier K². The latch L passes into the recess $b$ in the bearing-guard V, and, springing up, releases the loop beneath it, which slips forward off the jaws J J, from the natural strain of the bound grain over the ends of the cords held fast by the closed jaws. The shaft R still revolving, the cam on the disk G is passed, the shaft is drawn back, and the ends of the cords $q$ and $q'$ are freed, but not until the loop has passed over them and a secure loop-knot has been formed.

I claim—

1. In automatic grain-binders, the driving-shaft B, with the wheels C and D, the shaft R, carrying the recessed disk G, bearing upon the stud Q, and the wheel F, with the cam X engaging in the elbow of the handle H of the cutting and holding apparatus Z, the tube T upon the shaft R, carrying the cam-disk P, engaging in the bearing-guard V, the tapering semi-cylindrical jaws J J, operated by the shaft R and the pressure of the cord in forming the loop, and the latch L, with the cord-carrier K, the arm M, with the cord-carier K², actuated by the wheel E, combined and operated as herein described.

2. The arm M, bearing the cord-carrier K², in combination with the wheel E and the jaws J J, so constructed that its arc of movement is shortened as it forces the cord-ends $q\ q'$ from the cord-carrier K into the opening $c$.

3. The latch L, bearing the cord-carrier K, so combined and arranged with the revolving-tube T and the movable jaws J J as to hold the cord after it has been cut from the cord on the spool and is being wound around the jaws J J to form the loop, while the cord-carrier K retains the loose ends $q\ q'$ for the action of the arm M and cord-carrier K², substantially as described.

In testimony whereof I have signed my name to this specification before two subscribing witnesses.

JACOB D. JONES.

Witnesses:
E. S. MUSSEY,
ROBERT KEY.